United States Patent
Stroppiana

(10) Patent No.: US 7,060,334 B2
(45) Date of Patent: Jun. 13, 2006

(54) INFILL MATERIAL FOR SYNTHETIC-GRASS STRUCTURES, CORRESPONDING SYNTHETIC-GRASS STRUCTURE AND PROCESS OF PREPARATION

(75) Inventor: Fernando Stroppiana, Grinzane Cavour (IT)

(73) Assignee: Mondo S.p.A., Gallo D'Alba (IT)

( * ) Notice: Subject to any disclaimer, the term of this patent is extended or adjusted under 35 U.S.C. 154(b) by 0 days.

(21) Appl. No.: 10/865,229

(22) Filed: Jun. 10, 2004

(65) Prior Publication Data

US 2005/0003193 A1    Jan. 6, 2005

(30) Foreign Application Priority Data

Oct. 6, 2003    (EP) .................................. 03425369

(51) Int. Cl.
*A41G 1/00*    (2006.01)

(52) U.S. Cl. .......................................... 428/17; 428/95
(58) Field of Classification Search .................. 428/17, 428/85, 504
See application file for complete search history.

(56) References Cited

U.S. PATENT DOCUMENTS

| | | | | |
|---|---|---|---|---|
| 4,356,220 A | * | 10/1982 | Benedyk ...................... 428/17 |
| 4,617,208 A | | 10/1986 | Cadenhead, Sr. ............ 428/17 |
| 4,735,825 A | * | 4/1988 | Friedrich .................... 427/202 |
| 5,090,154 A | * | 2/1992 | Jacob .............................. 47/9 |
| 5,543,172 A | | 8/1996 | Jakubisin et al. ........... 427/212 |
| 5,958,527 A | | 9/1999 | Prévost ........................ 428/17 |
| 6,299,959 B1 | * | 10/2001 | Squires et al. ............... 428/87 |
| 6,527,889 B1 | | 3/2003 | Paschal et al. .............. 156/72 |
| 6,794,007 B1 | * | 9/2004 | Carr et al. .................... 428/87 |
| 2001/0015022 A1 | * | 8/2001 | Singer et al. ................. 36/28 |
| 2002/0128366 A1 | | 9/2002 | Coffey ........................ 524/425 |

FOREIGN PATENT DOCUMENTS

| | | |
|---|---|---|
| DE | 202 17 142 U1 | 1/2003 |
| EP | 1 158 099 A2 | 11/2001 |
| EP | 1 319 753 A2 | 6/2003 |
| EP | 1 375 750 A1 | 1/2004 |
| EP | 1 389 649 A2 | 2/2004 |
| WO | WO 01/72875 A1 | 10/2001 |

* cited by examiner

*Primary Examiner*—Jennifer McNeil
*Assistant Examiner*—Daniel Miller
(74) *Attorney, Agent, or Firm*—Seed IP Law Group PLLC

(57) ABSTRACT

A particulate filling material (infill) for synthetic-grass structures, comprises granules, which have: a core of recycled-tire material; and a coating layer of a plastic material which encapsulates the core of recycled-tire material.

20 Claims, 2 Drawing Sheets

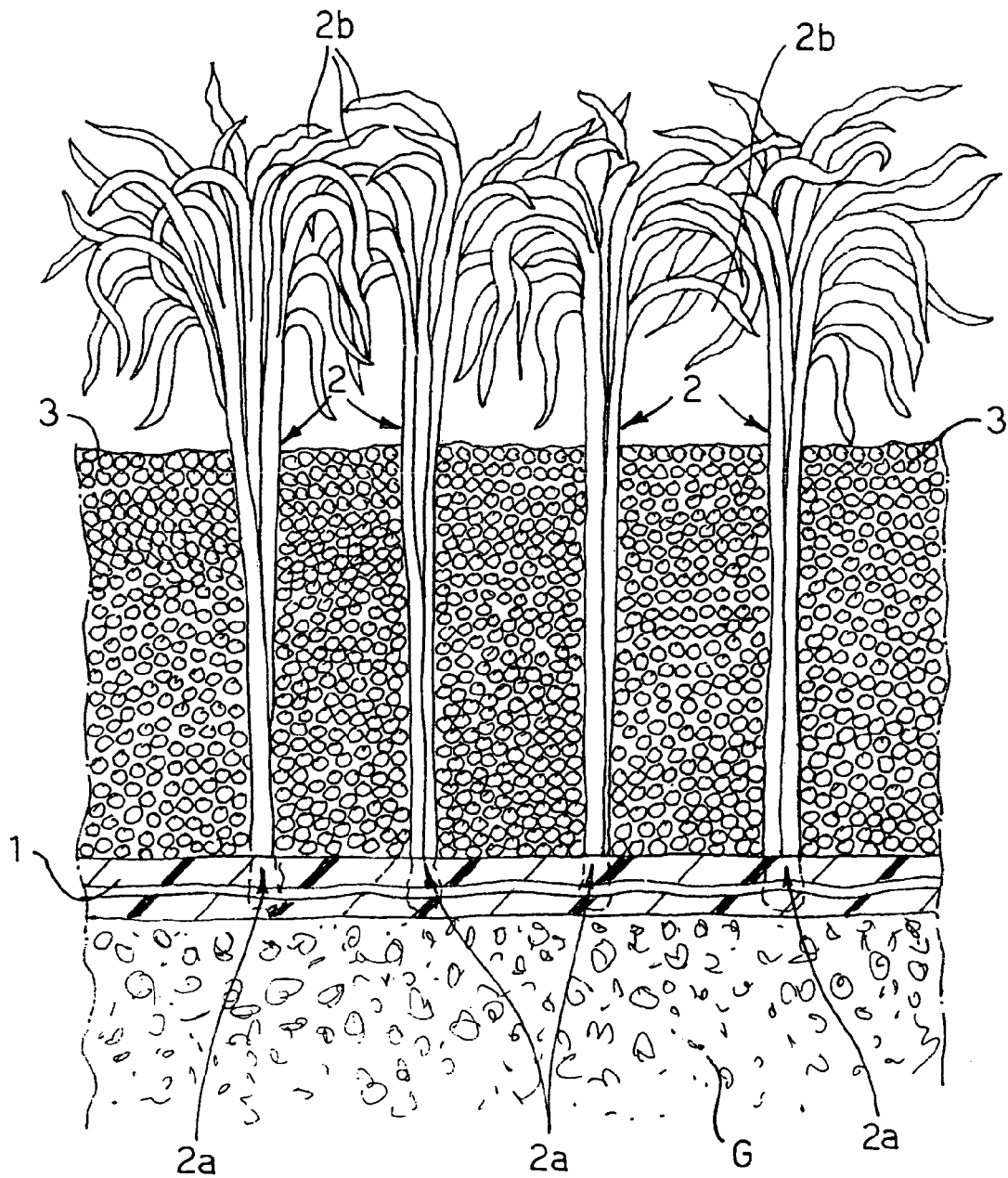
Fig_1

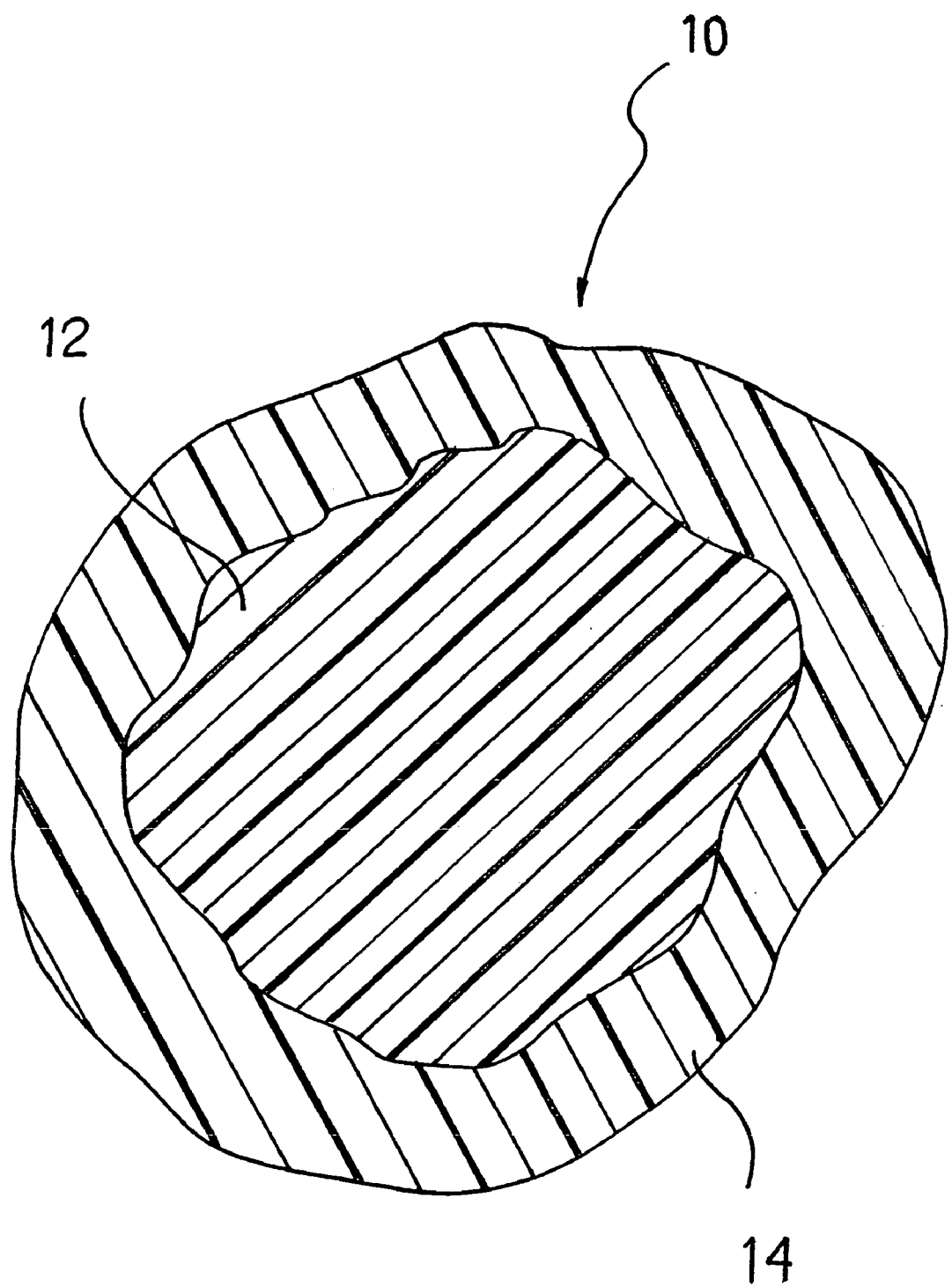
Fig_2

INFILL MATERIAL FOR SYNTHETIC-GRASS STRUCTURES, CORRESPONDING SYNTHETIC-GRASS STRUCTURE AND PROCESS OF PREPARATION

BACKGROUND OF THE INVENTION

1. Field of the Invention

The present invention relates to synthetic-grass structures and in particular to the corresponding filling materials (referred to commonly by the term "infill").

2. Description of the Related Art

Synthetic-grass structures usually comprise a substrate with a plurality of filiform formations extending from the substrate so as to simulate the sward of natural grass cover or turf. The particulate infill dispersed between said formations has the primary purpose of keeping the filiform formations themselves in a substantially upright condition.

Solutions of this type are described, for example, in U.S. Pat. No. 5,958,527 or EP-A-1 158 099. In particular, in the solution described in the latter document, which is filed in the name of the present applicant, the particulate filling material (infill) consists of a substantially homogeneous mass of granular plastic material.

Further information on said structures may be obtained from EP-A-1 319 753, which describes a method for removing said synthetic-grass structures with a view to the possible recovery of components, and again from the European patent applications 02029021.9 and 02425398.1, also these documents being, as likewise EP-A-1 319 753, filed in the name of the present applicant.

The synthetic-grass structures referred to previously are increasingly considered as a valid alternative to natural turf, in particular, for applications in which, for various reasons (environmental conditions, intense use, etc.) the upkeep of natural grass cover proves critical, also as regards the expenditure involved in said upkeep.

For example, it is known to use synthetic-grass structures of the type described for making sports fields, such as soccer pitches, American football pitches, tennis courts, and five-a-side football pitches. It is also possible to envisage the use of synthetic-grass structures of this type for laying athletics tracks.

In the production of the synthetic-grass cover of the type described, it is necessary to take into account various sorts of basic factors.

One aim of the invention is to create synthetic-grass cover that will have an appearance as close as possible to the appearance of natural turf. In other words, the aim is to prevent a synthetic-grass cover from revealing its nature too evidently. The aesthetic aspect, and in particular the chromatic appearance of synthetic-grass cover, may be influenced also by the nature and by the characteristics of the infill. In fact, even though in normal conditions of laying the material in question is to a large extent hidden from view by the filiform formations that simulate natural sward, the coloring of the infill contributes to the overall chromatic effect of synthetic-grass cover, a chromatic effect which, in the vast majority of cases, has the aim of simulating as faithfully as possible the chromatic effect of natural turf.

Other factors to be taken into account are linked to the wear of the synthetic-grass cover during use. In the absence, in fact, of the mechanism of re-growth of natural turf, synthetic-grass cover tends to wear out (or at least to be altered) in a non-uniform way according to the different conditions of use and of stress to which different areas of the flooring may be subjected. To provide an example in order to facilitate understanding, it may immediately be appreciated that, in the case of a flooring for a pitch for playing soccer, a midfield area and the areas of the goal tend to be particularly subject to stresses, and hence to wearing out to a more marked extent than the other areas, such as for example the areas near the corners of the field or immediately at the sides of a goal. It should then be taken into consideration that some types of stress may lead to the infill getting knocked out of place: it will suffice to consider typically the case of an athlete who is wearing shoes provided with studs or spikes and who exploits precisely these studs or spikes to exert a strong thrust forwards or a sharp deceleration. Usually, the filiform formations of the grassy cover do not exert an appreciable action of anchorage in regard to the infill when the infill is subjected to such an intense stress.

In this context, it is important that the artificial cover—and above all the infill—must enable rain water to run off easily, preventing any phenomena of waterlogging, formation of puddles, and any risk of the infill floating on the water.

Other factors to be taken into consideration are strictly linked to the laying of the synthetic-grass flooring. Common practice is to lay first the sheet substrate provided with the filiform formations that simulate the grassy sward of natural turf and subsequently to sow on said cover the particulate infill.

This operation carried out "in field" is of course open to various critical factors. Just to limit our considerations to a few examples, before proceeding to sow particulate infill it is usually preferable to carry out a prior intervention on the filiform formations so that the latter will, at the moment of sowing of the infill, be oriented in a substantially vertical direction, the aim being to have the particulate material gradually deposited starting from the lowest level adjacent to the ground. Again, the exact dosage of the amount of particulate material deposited per unit surface requires the availability of appropriate equipment and, in general, of skilled staff. In the case where the infill is a plastic material, there may then enter into play other factors, for example ones linked to the temperature at which the operation of sowing the infill is carried out.

Finally, a further set of factors to be taken into account is linked both to considerations of an economic nature and to considerations of environmental impact.

The first forms of synthetic-grass cover envisage in fact, in the majority of cases, the use of infill consisting of sand, i.e., a material which has undoubtedly the advantage of being inexpensive and readily available, but which presents numerous drawbacks in relation to all the factors of use and application considered previously. Furthermore, the use of sand (or of particulate infill with quite a high component of sand) negatively affects the biomechanical characteristics of the artificial grass cover and moreover exposes the person who happens to fall on the synthetic-grass flooring to serious risks of injury.

The use, as particulate infill for synthetic-grass flooring, of granular plastic materials practically overcomes all the drawbacks delineated above, but comes up against evident considerations of cost.

The above considerations may play a determining role if it is considered that the interest in the installation of synthetic-grass flooring may arise not only in statutory sports bodies or organizations of a professional or semi-professional character, but also in the sphere of amateur institutions.

For this reason there has been proposed and adopted the choice of using as particulate infill granular material obtained from recycled-tire material and in particular from automobile tires.

The term "recycled-tire material" comprises in itself a certain range of compositions. This consists, in the majority of cases, of elastomer compounds (for example SBR) with the addition, to a greater or lesser extent, of carbon-black fillers, these compounds possibly containing within them, according to commonly used recycling techniques, more or less extensive amounts of impurities. These may, for example, be metallic impurities deriving from metallic components and from the reinforcement fabric of tires when these have undergone cutting and shredding for producing the recycled granules.

The use of particulate recycled-tire material as infill for synthetic-grass cover thus presents undoubted advantages of an economic nature, it being a material that is readily available in large quantities and at a contained cost, since it is, above all, a material the disposal of which is to be facilitated. However, it presents rather important disadvantages from all the other points of view considered previously.

In the first place, the amply preponderant black coloring (due to the high content of carbon black of said recycled material) ends up, in the majority of applications, by adversely conditioning the overall chromatic appearance of the artificial grass cover. In addition, said black coloring involves a high absorption of solar radiation, with a consequent possible overheating of the synthetic-grass cover, until it reaches—in the said cover—a temperature in the region of 60–65° C., given a temperature of the air of 28–30° C.

In the second place, at least in certain materials recycled from tires, the phenomena of wear deriving from the mechanical stresses applied to the synthetic-grass cover during use may lead, in the areas subjected to high stress, to a further fragmentation of the granules and/or to ablation from the granule itself of microscopic particles having the character of a dust, which may get kicked up or rise in an undesirable way from the synthetic-grass structure. This moreover phenomenon occurs in a markedly differentiated way in different areas of the synthetic-grass flooring, according to the more or less intense conditions of mechanical stress.

The carbon black that is present and may be released from said infill is—as is well known—an excellent pigment. This means that anyone who accidentally happens to fall on the synthetic-grass cover which contains said infill, when he picks himself up will find that he has more or less extensive black patches on parts of his body and clothes involved in impact with the ground.

Again, a factor that is extremely negative, the dust of carbon black (and of metallic contaminants present possibly as residue) that is released by said infill is readily washed away by rain water into the underlying ground, with a pollutant effect, if it is also taken into account that the carcasses of tires may contain metallic components which might give rise to toxic residue or at least residue that is hardly compatible with the environment.

Finally, it is important that the material deriving from recycled tires, which is used as infill for a synthetic-grass structure, was initially formulated for an altogether different use and is characterized by a relatively low density (typically comprised between 0.9 and 1.1 g/cm$^3$), combined with a high degree of resilience.

Both of these characteristics are unfavorable for use as infill for synthetic-grass floorings. The first of these characteristics (low density) favors in fact the possible floating of the infill on water, with consequent risk of undesirable displacement. The second of these characteristics (high resilience) means that the synthetic-grass cover proves too elastic not only for the tread and for the purposes of running but also as regards bouncing of a ball used for a particular sport.

BRIEF SUMMARY OF THE INVENTION

The purpose of the present invention is to provide a solution capable of overcoming in a decisive way the critical factors delineated previously.

According to the present invention, said purpose is achieved thanks to an infill which has the characteristics referred to specifically in the ensuing claims. The invention relates also to a corresponding synthetic-grass flooring and to the method of preparation of the infill.

BRIEF DESCRIPTION OF THE SEVERAL VIEWS OF THE DRAWING(S)

The invention will now be described, purely by way of non-limiting example, with reference to the annexed drawings, in which:

FIG. 1 reproduces schematically a vertical cross section of a synthetic-grass structure according to the invention; and FIG. 2 illustrates an example of an infill usable in the synthetic-grass structure illustrated in FIG. 1.

DETAILED DESCRIPTION OF THE INVENTION

FIG. 1 illustrates a structure of a synthetic-grass cover, which comprises a sheet substrate 1 designed to be laid on a subfloor G consisting, in the most typical conditions of use, of a subfloor of tamped earth or a bituminous mat on which the synthetic-grass structure is laid usually in conditions of free laying.

The sheet substrate may be formed by a sheet made of plastic material such as, for example, a non-woven rubberized fabric with the application, for example, of latexes such as for example SBR or polyurethane latexes. There may advantageously be associated to the substrate in question, on the side that is designed to face the subfloor G, a layer of foamed, for example polyurethane-based, material.

Starting from the substrate 1 there extend upwards a plurality of filiform formations 2 usually ordered in tufts so as to simulate better the blades of grass of natural turf.

The filiform formations 2 are anchored to the substrate 1 at their proximal ends, designated by 2a, and extend upwards with their distal ends for an overall length, measured starting from the general plane of lie of the substrate 1, Which may be typically comprised between 10 mm and 80 mm, according to one embodiment. The quantitative data indicated above of course have a purely orientative character.

In one embodiment here illustrated, the distal ends 2b, instead of an overall rectilinear pattern, as occurs in the majority of the synthetic-grass cover normally produced, have a tortuous, i.e., "curly" pattern.

Consequently, the filiform formations 2 are ordered in tufts that have a general conformation which may be defined as "tree-like".

In the context of the aforesaid bushy formations, there is thus distinguishable:

a "trunk" part, adjacent to the proximal end 2a and which has an overall rectilinear pattern; and a top or "crown" part, which defines precisely the distal end 2b with the curly pattern referred to previously.

The general criteria of embodiment of the substrate 2 and of the filiform formations 2 (including the modalities for achieving the firm anchorage of the proximal ends 2a of the filiform formations 2 on the substrate 1 and bestow—possibly—on the distal ends 2b the bushy appearance visible in FIG. 1) are known to the prior art and thus do not require a detailed description herein, also because they are in themselves not important for the purposes of an understanding of the invention.

As regards the choice of the material forming the filiform formations 2 (whether these have a substantially rectilinear pattern or present the tree-like appearance here illustrated), one embodiment includes polyolefins, such as polyethylene or polypropylene or, more in general, to all plastic materials which are suited for being subjected to processes of extrusion, spinning and/or drawing so as to give rise to filaments capable of simulating the appearance of the blades of grass of natural turf.

The materials cited above are moreover usually characterized in that they enable pigmentation with relative ease using pigments that may be added to the material for forming the filiform formations so as to bring about a bulk coloring, which is maintained practically constant even after prolonged use of the synthetic-grass flooring.

In general, the absolute and relative dimensions of the filiform formations 2, measured in a direction orthogonal to the plane of extension of the substrate 1 are not in themselves particularly critical for implementation of the invention: the choice of particular dimensional values, whether absolute or relative, is thus chiefly determined by the use to which the flooring will be put.

Purely by way of indicative example, as regards applications in the sector of sports facilities, use of the said synthetic-grass flooring for tennis courts will thus tend to privilege embodiments with shorter pile, whereas in the case of soccer pitches or American-football pitches, the choice will preferably favor embodiments with longer pile.

On top of the substrate 1, and hence between the filiform formations 2, there is dispersed a particulate (or granular, the terms here being used as synonyms) material, which functions as infill 3. The function of the material 3 is substantially that of maintaining the filiform formations 2 in the upright condition, so preventing them from lying down flat in an undesirable way on the substrate 1.

The particulate infill 3 is dispersed between the filiform formations 2 in amounts sufficient to cause the filiform formations 2 to be supported by the infill 3 practically throughout the extent of the rectilinear portion of the bushy structure.

In one embodiment, the particulate infill 3 is a substantially homogeneous material, dispersed on top of the substrate 1 between the filiform formations 2 in a substantially uniform way, without giving rise to superimposed layers with markedly differentiated characteristics.

The choice of the infill 3, the modalities of distribution (thickness or height of the layer of infill 3, grain size of the material, etc.) chiefly determine the characteristics of hardness/compliance of the grassy cover.

The aforesaid characteristics of hardness/compliance of the synthetic-grass cover may be identified in quantitatively precise terms by resorting to the elastic impact test forming the subject of the DIN standard 18035/7. Said standard enables definition of a parameter or coefficient, known as KA (abbreviation of the German "Kraftabbau", i.e., "force reduction").

The coefficient KA basically corresponds to a characterization, in percentage terms, of the behavior of a flooring subjected to the fall of a heavy object of normalized dimensions as compared to the behavior manifested in regard to the same load by a rigid surface typically made of cement.

An important characteristic of the solution described herein is provided by the structure of the granules comprising the layer of infill 3.

Said structure is illustrated in greater detail in the view of FIG. 2, which presents an idealized view in diametral cross section of a granule 10 comprised in said layer of infill.

As regards the granule 10, it can basically be distinguished into two parts:

a core part 12, consisting of a granule of recycled-tire material typically having a diameter in the region of 0.4–2 mm, and an outer coating layer 14, which envelops (in practice encapsulating it) the core 12, said coating layer 14 being made of a plastic material.

This is typically of a plastic, usually thermoplastic, material with a base of polyolefins, vinyl polymers and/or thermoplastic rubbers.

The general criteria of production of the core parts 12 of the granules 10 are to be considered widely known from the solutions already adopted in the prior art, which envisage the use, as infill for synthetic-grass cover, of "recycled-tire material".

As has already been said, this expression is understood in itself to comprise a variety of possible formulations, which may, however, be considered as substantially unitary, both as regards the composition (usually an elastomer compound, such as SBR of the type commonly used for making tires, and in particular automobile tires, which typically contains carbon-black fillers and usually a more or less extensive percentage of impurities, such as finely crushed metallic residue) and also as regards the problems linked to the possible use as infill for synthetic-grass cover.

For the material forming the layer 14 several embodiments are represented:

as regards polyolefins, by polyethylene of medium and low density;

as regards vinyl polymers, by ethyl-vinyl-acetate (EVA); and as regards thermoplastic rubbers, by styrene-butadiene-styrene (SBS) and styrene-ethylene-butadiene-styrene (SEBS).

Of course, the materials indicated above may possibly be used in combination with one another. There is then usually present fillers consisting, for example, of inorganic fillers, such as calcium carbonate and/or kaolin.

In one embodiment, the material of the layer 14 is pigmented, typically in bulk, with the addition of pigments designed to bestow thereon a coloring that contrasts with the black coloring of the core 12, for example, an overall coloring of a shade of green or brown.

The fact that the granule 12 of recycled-tire material is encapsulated by the film formed by the layer 14 provides an excellent solution to practically all of the problems which otherwise might render critical the use of recycled-tire material as infill for synthetic-grass floorings, at the same time without adversely affecting the substantial economic advantage linked to the use of recycled-tire material.

Following the same order of presentation of the critical factors adopted in the introductory part of the present description, the encapsulation layer 14 is suited for being pigmented (according to the criteria already referred to previously) so as to mask the blackish pigmentation of the core granules 12, thus achieving the desired adaptation to the overall chromatic effect of the synthetic-grass cover and at the same time reducing the level of absorption of solar radiation and possible overheating of the cover.

On account of its encapsulating function, the coating layer 14 is such that, even though the core granule 12 is subjected to fragmentation or ablation as a consequence the mechanical stresses to which it is subject in use, the fine material (dust/carbon black) thus generated will remain in any case trapped within the film 14 and will thus not run any risk of being dispersed outside.

In this regard, it will be appreciated that the materials proposed for making the layer 14 have intrinsic qualities of toughness and resistance such as to reduce to a bare minimum any risk of the capsule formed by the film 14 breaking up and so producing undesirable dispersion of the material contained therein.

The encapsulation film 14 in any case determines the characteristics of fluency of the particulate material 3, both as regards the possibility of rendering the material in question "flowable", so facilitating its dispersion at the moment of laying of the synthetic-grass flooring, and in the sense of the possibility of rendering the particulate material 3 at least partially cohesive, for example by means of the addition of a binder or by means of a treatment of compacting.

As has already been said previously, the coating film 14 isolates the granule of recycled-tire material 12 from the external environment, thus eliminating at the root all the possible problems of environmental incompatibility linked to the use of said material.

As further factor of advantage it is possible to note again that, given the same characteristics of the granule 12 forming the core by adjusting the thickness and/or the characteristics of the material forming the inner layer of coating 14, it is possible to modify selectively the characteristics of density and resilience of the infill and of the synthetic-grass flooring in which the infill is comprised, so preventing the negative phenomena linked to the low density and to the high resilience of the recycled-tire material.

Typically, with the solution here described, it is possible to provide granules 10 which have a density in any case higher than 1 g/cm$^3$ and typically comprised between 1.1 and 1.3 g/cm$^3$.

As regards the method of preparation of the "bi-component" particulate material here described, the tests conducted by the present applicant have demonstrated that the technique of preparation that are at the moment the simplest and least expensive (which may at the same time give rise to a final material that is completely satisfactory from the functional point of view) is described in what follows.

In a normal mixer for thermoplastic materials, there is prepared, according to the methods commonly adopted in the art, a mix comprising one or more thermoplastic materials of the type recalled previously, some embodiments including the addition of mineral fillers and pigments. In particular, the addition of fillers is regulated according to the value of density desired for the final product, privileging larger additions and/or fillers of greater density when the aim is to obtain a final product of higher density.

There is then added to the mix recycled-tire particulate material which has a grain size compatible with the application envisaged. This is typically with dimensions of granules in the region of 0.4–2 mm in diameter.

In one embodiment, the amount of recycled-tire particulate material added to the mix is preferably lower than 50 wt % of the total. Values are typically comprised between 25 wt % and 35 wt.

The mix thus added is rendered homogeneous and then rolled (according to known methods) so as to form sheets with a thickness in the region of, for example, 5–10 mm. The sheets thus produced are left to cool and then undergo granulation.

For this purpose it is possible to resort to various known techniques such as, for example, shredding in a blade mill, crushing in a hammer mill or else passing the sheet material through an extruder, followed by granulation.

The final dimensions of the granules 10 are typically in the region of 0.5–3 mm.

The tests conducted by the present applicant demonstrate that the process of granulation may produce, in addition to the normal percentage of granules 10, the dimensions of which are above or below the range considered previously, also a certain fraction of granules 10, in which the action of the granulator members (in particular when they are cutting members) lead to an "exposure" of the core 12.

The said fraction is in any case extremely contained, and typically does not exceed 5% of the total number of granules (normal values are between 2% and 3%). The amount of said fraction is readily verifiable, for example by means of spectrophotometric/colorimetric analysis of a sample layer of particulate material, exploiting the different degree of absorption/reflectance of the material making up the core 12 and of the material of the coating 14.

Of course, without prejudice to the principle of the invention, the details of implementation and the embodiments may vary widely with respect to what is described and illustrated herein, without thereby departing from the scope of the present invention, as defined by the attached claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An infill material for a synthetic grass cover comprising:
   a plurality of individual granules, each granule having;
   a core of recycled-tire material; and
   a coating layer of a plastic material, which encapsulates said core of recycled-tire material;
   characterized in that said granule has at least one of the following features;
   said core of recycled-tire material constitutes less than 50 wt % of the total weight of said granule; and
   said coating layer of a plastic material has a thickness in the range of about 0.1 to 1mm.

2. The material according to claim 1, characterized in that said coating layer is selected from the group consisting of polyolefins, vinyl polymers and thermoplastic rubbers.

3. The material according to claim 2, characterized in that the coating layer comprises polyethylene.

4. The material according to claim 3, characterized in that the coating layer comprises polyethylene of medium and low density.

5. The material according to claim 2, characterized in that the material of said coating layer comprises ethyl-vinyl-acetate (EVA).

6. The material according to claim 2, characterized in that the material of said coating layer comprises styrene-butadiene-styrene (SBS) or styrene-ethylene-butadiene-styrene (SEBS).

7. The material according to claim 3, characterized in that the material of said coating layer comprises a filler.

8. The material according to claim 7, characterized in that said filler has a base of calcium carbonate and/or kaolin.

9. The material according claim 3, characterized in that said coating layer comprises at least one pigment with coloring contrasting with the coloring of said core.

10. The material according to any claim 1, characterized in that said core of recycled-tire material has diametral dimensions in the region of 0.4–2 mm.

11. The material according to claim 1, characterized in that said granules have diametral dimensions in the region of 0.5–3 mm.

12. The material according to claim 1, characterized in that said granules have a density higher than 1 g/cm$^3$.

13. The material according to claim 12, characterized in that said granules have a density in the region of 1.1–1.3 g/cm$^3$.

14. The material according to claim 1, characterized in that it comprises a fraction of said granules, in which said core is exposed on the outside of the granules.

15. The material according to claim 14, characterized in that said fraction of granules does not exceed 5% of the total number of granules.

16. The material according to claim 15, characterized in that said fraction of granules is in the region of 2% to 3% of the total number of granules.

17. The material according to claim 1, characterized in that said core of recycled-tire material constitutes approximately 25 wt % to 35 wt % of the total weight of said granule.

18. The material according to claim 1, characterized in that said core of recycled-tire material constitutes approximately 30 wt % of the total weight of said granule.

19. A synthetic-grass structure comprising:
  a sheet substrate with a plurality of filiform formations extending from the substrate to simulate a sward of natural turf; and
  a particulate infill comprising granules which have a core of recycled-tire material and a coating layer of a plastic material that encapsulates said core of recycled-tire material, the particulate infill being dispersed between said filiform formations so as to maintain the filiform formations themselves in a substantially upright condition;
  characterized in that said granule has at least one of the following features;
  said core of recycled-tire material constitutes less than 50 wt % of the total weight of said granule; and
  said coating layer of a plastic material has a thickness in the range of about 0.1 to 1mm.

20. The synthetic-grass structure according to claim 19, characterized in that said filiform formations are provided with respective proximal ends and distal ends with respect to the substrate, said distal ends being substantially curly, so that said filiform formations will have a general tufted conformation.

* * * * *

UNITED STATES PATENT AND TRADEMARK OFFICE
CERTIFICATE OF CORRECTION

PATENT NO. : 7,060,334 B2
APPLICATION NO. : 10/865229
DATED : June 13, 2006
INVENTOR(S) : Stroppiana et al.

It is certified that error appears in the above-identified patent and that said Letters Patent is hereby corrected as shown below:

On the Title Page,
Item (30), Foreign Application Priority Data, "Oct. 6, 2003" should read as
-- June 10, 2003 --.

Signed and Sealed this

Seventeenth Day of June, 2008

JON W. DUDAS
*Director of the United States Patent and Trademark Office*